United States Patent
McGill et al.

(10) Patent No.: US 11,475,720 B2
(45) Date of Patent: Oct. 18, 2022

(54) METHODS AND SYSTEMS FOR COLLECTING SENSOR DATA ACCORDING TO A DATA COLLECTION CONFIGURATION BASED ON AN ESTIMATED INFORMATION GAIN

(71) Applicant: Toyota Research Institute, Inc., Los Altos, CA (US)

(72) Inventors: Stephen G. McGill, Broomall, PA (US); Guy Rosman, Newton, MA (US); Luke S. Fletcher, Cambridge, MA (US); John J. Leonard, Newton, MA (US); Simon Stent, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 401 days.

(21) Appl. No.: 16/836,336

(22) Filed: Mar. 31, 2020

(65) Prior Publication Data
US 2021/0304524 A1    Sep. 30, 2021

(51) Int. Cl.
*G07C 5/08* (2006.01)
*G06N 3/02* (2006.01)
(Continued)

(52) U.S. Cl.
CPC ............. *G07C 5/008* (2013.01); *G06N 3/02* (2013.01); *G06N 20/00* (2019.01); *G07C 5/0808* (2013.01)

(58) Field of Classification Search
CPC ........ G07C 5/008; G07C 5/0808; G06N 3/02; G06N 20/00; G06N 3/0454; G06N 3/08
See application file for complete search history.

(56) References Cited

U.S. PATENT DOCUMENTS 9,168,924 B2 * 10/2015 Lee .................. B60W 50/04
10,140,544 B1 * 11/2018 Zhao .................... G06V 10/454
(Continued)

FOREIGN PATENT DOCUMENTS

CN         109167805 A      1/2019
DE     102019109933 A1    10/2019
(Continued)

OTHER PUBLICATIONS

Ufuk Can Bicici, Cem Keskin, Lale Akarun, "Conditional Information Gain Networks", Jul. 25, 2018, 6 pages, https://arxiv.org/pdf/1807.09534.pdf.
(Continued)

*Primary Examiner* — Sizo B Vilakazi
(74) *Attorney, Agent, or Firm* — Dinsmore & Shohl LLP (57) ABSTRACT

An embodiment takes the form of a vehicle that generates a data collection configuration for one or more vehicle sensors of a vehicle based on an estimated information gain to a neural network were the vehicle to provision the neural network with notional sensor data, and based on a vehicle resource consumption by the vehicle were the vehicle to provision the neural network with the notional sensor data. The notional sensor data comprises sensor data that would be collected from a given sensor among the vehicle sensors according to a respective sensor configuration of the given sensor. The vehicle collects sensor data from the vehicle sensors according to the generated data collection configuration.

20 Claims, 6 Drawing Sheets

(51) Int. Cl.
  *G06N 20/00* (2019.01)
  *G07C 5/00* (2006.01)

(56) References Cited

U.S. PATENT DOCUMENTS

| | | | |
|---|---|---|---|
| 11,126,187 B2 * | 9/2021 | Mcgill, Jr | G06N 3/08 |
| 11,300,967 B2 * | 4/2022 | McGill | B60W 30/00 |
| 2019/0311220 A1 | 10/2019 | Hazard et al. | |
| 2019/0324442 A1 | 10/2019 | Celia et al. | |
| 2020/0103244 A1 * | 4/2020 | Celia | G06V 10/82 |
| 2021/0042627 A1 * | 2/2021 | Kapoor | G06N 3/088 |

FOREIGN PATENT DOCUMENTS

| | | |
|---|---|---|
| EP | 0582236 B1 | 6/1998 |
| JP | 2015001891 A | 1/2015 |

OTHER PUBLICATIONS

K. Jearanaitanakij & O. PINNGERN, "An Information Gain Technique for Acceleration of Convergence of Artificial Neural Networks", 2005 5th International Conference, 3 Pages, https://ieeexplore.ieee.org/document/1689065.

* cited by examiner

METHODS AND SYSTEMS FOR COLLECTING SENSOR DATA ACCORDING TO A DATA COLLECTION CONFIGURATION BASED ON AN ESTIMATED INFORMATION GAIN

TECHNICAL FIELD

The present disclosure generally relates to a systems, vehicles, computing devices, and methods carried out by the systems and computing devices, and more specifically, to systems, vehicles, computing devices, and methods for collecting sensor data from one or more vehicle sensors according to a data collection configuration based on an estimated information gain to a neural network.

BACKGROUND

Vehicles (such as autonomous and semi-autonomous vehicles) are often equipped with a driver-assistance system, which may be able to aid a driver of a vehicle by providing features such as adaptive cruise control, lane departure warnings, lane centering, and collision avoidance. These features may operate based on sensor data collected from one or more sensors of the vehicle, such as a camera or a radar sensor. For instance, an adaptive cruise control (ACC) may use sensor data to determine a distance to another vehicle traveling in front of the vehicle equipped with ACC, and may automatically adjust a speed of the vehicle to maintain a given distance behind the other vehicle.

SUMMARY

An embodiment of the present disclosure takes the form of a method that includes generating a data collection configuration for one or more vehicle sensors of a vehicle based on an estimated information gain to a neural network were the vehicle to provision the neural network with notional sensor data, and based on a vehicle resource consumption by the vehicle were the vehicle to provision the neural network with the notional sensor data. The notional sensor data comprises sensor data that would be collected from a given sensor among the vehicle sensors according to a respective sensor configuration of the given sensor. The method further includes collecting sensor data from the vehicle sensors according to the generated data collection configuration.

Another embodiment takes the form of a vehicle that includes one or more vehicle sensors, a processor, and a non-transitory computer-readable storage medium comprising instructions. The instructions, when executed by the processor, cause the vehicle to generate a data collection configuration for the vehicle sensors based on (i) an estimated information gain to a neural network were the vehicle to provision the neural network with notional sensor data, and (ii) a vehicle resource consumption by the vehicle were the vehicle to provision the neural network with the notional sensor data. The instructions further cause the vehicle to collect sensor data from the vehicle sensors according to the generated data collection configuration. The notional sensor data comprises sensor data that would be collected from a given sensor among the vehicle sensors according to a respective sensor configuration of the given sensor.

A further embodiment takes the form of a method that includes generating a prediction of a characteristic of a road agent based on a sample set of sensor data collected from a given sensor among one or more vehicle sensors of a vehicle according to a test configuration of the given sensor. The method further includes obtaining an observation of the characteristic of the road agent based on sensor data collected from the vehicle sensors, and estimating an estimated information gain to a neural network were the vehicle to provision the neural network with notional sensor data. The notional sensor data comprises sensor data that would be collected from a given sensor among the vehicle sensors according to a respective sensor configuration of the given sensor. The estimated information gain is based on a comparison of the prediction of the characteristic with the observation of the characteristic. The method also includes generating a data collection configuration for the vehicle sensors based on the estimated information gain and a vehicle resource consumption by the vehicle were the vehicle to provision the neural network with the notional sensor data. The method additionally includes collecting sensor data from the vehicle sensors according to the generated data collection configuration.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Systems, vehicles, computing devices, and methods for collecting sensor data from one or more vehicle sensors according to a data collection configuration based on an estimated information gain to a neural network are disclosed herein. Such a neural network may be deployed to and executed by a vehicle, via which the vehicle may generate various predictions based on collected sensor data—for example, predictions of future trajectories of road agents (e.g., other vehicles) in proximity to the vehicle. To improve an accuracy of these predictions, the neural network could be further executed by a training server, which could be further trained by the training server based on sensor data collected by the vehicle and provided to the training server. The trained neural network could then be deployed vehicle 100 (or another vehicle).

Providing sensor data to the training server may consume (potentially considerable) vehicle resources of the vehicle, such as processor time or communication interface throughput (e.g., if the vehicle is communicatively connected to the training server over a network via a wireless communication link). Moreover, providing sensor data to the training server in some scenarios may needlessly consume vehicle resources—for example, if the accuracy of predictions by the neural network would not improve significantly even if the neural network were trained based on the provided sensor data. Because the vehicle may have limited vehicle resources, providing sensor data to the training server in such scenarios could prevent the vehicle from performing other functions that also consume vehicle resources but that may produce a greater benefit to the vehicle or the training server (than would providing sensor data to the training server as described above).

In some embodiments, a vehicle generates a data collection configuration for one or more vehicle sensors of a vehicle based on an estimated information gain to a neural network were the vehicle to provision the neural network with notional sensor data, and based on a vehicle resource consumption by the vehicle were the vehicle to provision the neural network with the notional sensor data. The notional sensor data comprises sensor data that would be collected from a given sensor among the vehicle sensors according to a respective sensor configuration of the given sensor. The vehicle collects sensor data from the vehicle sensors according to the generated data collection configuration. The estimated information gain may reflect, for instance, an estimated improvement to an accuracy of predictions generated by the neural network executed by the training server, if the training server were to train the neural network based on sensor data that would be (but has not yet been) collected according to the respective sensor configuration of the given sensor.

Accordingly, the subsequent collection of sensor data from the vehicle sensors according to the generated data collection configuration may reflect a comparison of the benefits (e.g., the estimated information gain) and the costs (e.g., the vehicle resource consumption) of provisioning the neural network with sensor data that would be collected according to the respective sensor configuration of the given sensor.

Various embodiments of systems, computing devices, and methods for collecting sensor data from one or more vehicle sensors according to a data collection configuration based on an estimated information gain to a neural network will now be described in detail with reference to the drawings.

Figure 1:
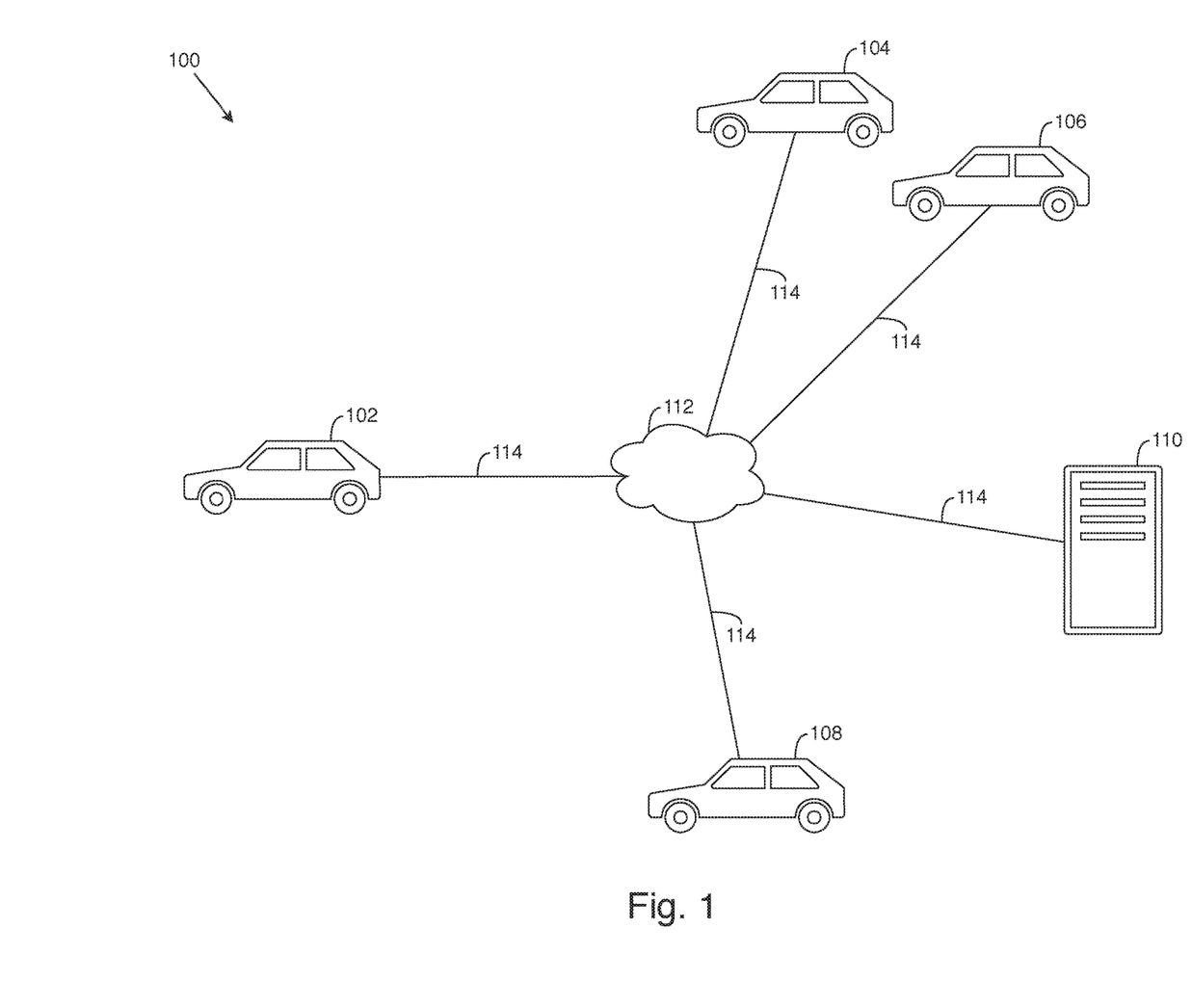
FIG. 1 depicts an example system, according to one or more embodiments illustrated and described herein.

FIG. 1 depicts a system, according to one or more embodiments illustrated and described herein. As shown, a system 100 includes vehicle 102, vehicle 104, vehicle 106, vehicle 108, and training server 110, each of which are communicatively connected via a network 112 and respective communication links 114 to network 112. It should be understood that system 100 could include different and/or additional entities.

Vehicle 102 could take the form of an autonomous vehicle, a semi-autonomous vehicle, or a manually-operated vehicle, among other possibilities. The vehicle could include a computing device configured to carry out the vehicle functions described herein. Any one or more of vehicle 104, vehicle 106, and vehicle 108 could take a form similar to that of vehicle 106. Additional details regarding vehicle 102 are provided below.

Training server 110 could take the form of a mainframe, a workstation, a terminal, a personal computer, a virtual machine, or any combination of these or other devices configured to carry out the server functions described herein. Though system 100 is shown as including a single server, it should be understood that the system could include multiple servers. Training server 110 is discussed in additional detail below.

Network 112 may include one or more systems and network infrastructure configured to facilitate communication between any one or more of vehicle 102, vehicle 104, vehicle 106, vehicle 108, and training server 110. The network may take the form of (or include) one or more Wide-Area Networks (WANs), Local-Area Networks (LANs), the Internet, cellular networks, wired networks, wireless networks, or any combination of these or other networks. Network 112 may operate according to one or more communication protocols such as Ethernet, Wi-Fi, IP, TCP, or LTE, as examples. Though the network is shown as a single network, it should be understood that the network may include multiple, distinct networks that are communicatively linked. The network could take other forms as well.

Communication links 114 may communicatively link respective entities with network 112 to facilitate communication between entities communicatively connected to the network, and could take the form of one or more wired and/or wireless communication links. Any of communication links 114 may be a combination of hardware and/or software, perhaps operating on one or more communication-link layers such as one or more physical, network, transport, and/or application layers. Additionally, the communication links may include one or more intermediate paths or systems, for example.

Figure 2:
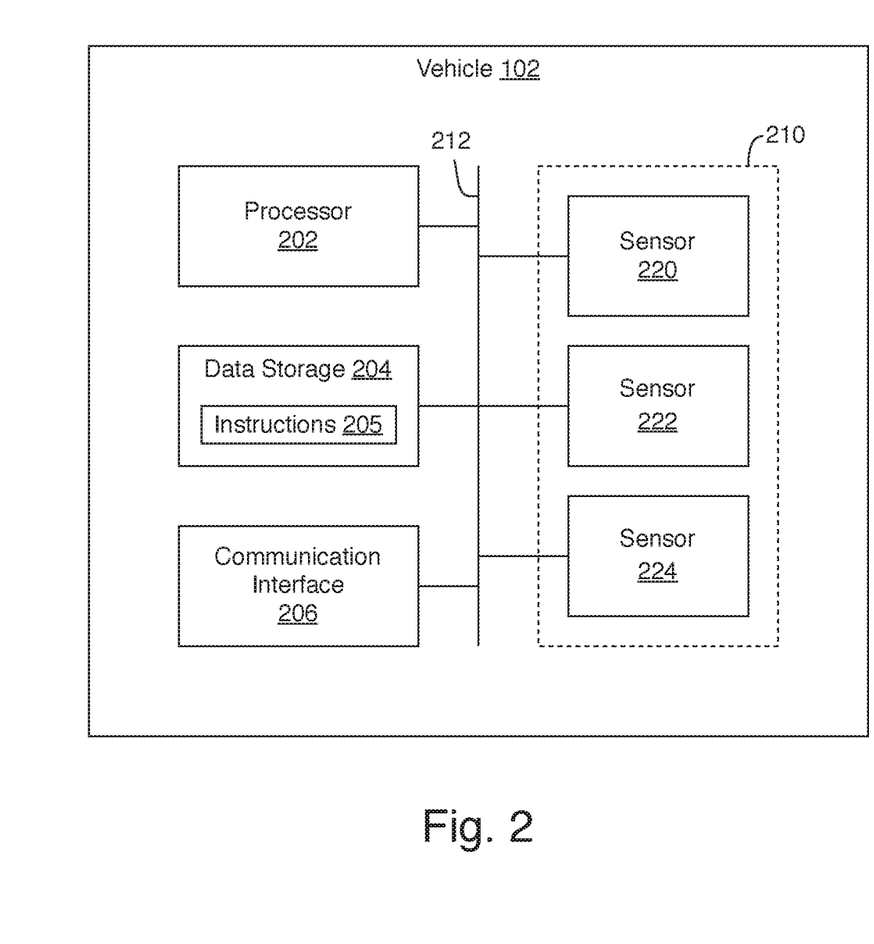
FIG. 2 depicts a block diagram of an example vehicle, according to one or more embodiments illustrated and described herein.

FIG. 2 depicts a block diagram of a vehicle, according to one or more embodiments illustrated and described herein. As shown, vehicle 102 includes a processor 202, a data storage 204 including instructions 205, a communication interface 206, and one or more vehicle sensors 210, each of which are communicatively connected via a system bus 212. It should be understood that vehicle 102 may include different and/or additional components, and some or all of the functions of a given component could instead be carried out by one or more different components. The processor, data storage, communication interface, and vehicle sensors may collectively form a computing device, and vehicle 104, vehicle 106, vehicle 108, training server 110, or any combination of these could take the form of (or include) a similar computing device that includes one or more components similar to those depicted and described with reference to FIG. 2.

Processor 202 may take the form of one or more general-purpose processors and/or one or more special-purpose processors, and may be integrated in whole or in part with data storage 204, communication interface 206, vehicle sensors 210, and/or any other component of vehicle 102, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 205 may be stored in data storage 204, and may include machine-language instructions executable by processor 202 to cause vehicle 102 to perform the vehicle functions described herein. Additionally or alternatively, instructions 205 may include script instructions executable by a script interpreter configured to cause processor 202 and vehicle 102 to execute the instructions specified in the script instructions. In an embodiment, the instructions include instructions executable by the processor to cause the vehicle to execute a neural network. It should be understood that instructions 205 may take other forms as well.

Additional data may be stored in data storage 204, such as collected sensor data and/or parameters of a neural network or other function, as will be described in further detail below. The additional data could be stored as a table, a flat file, data in a file system of the data storage, a heap file, a B+ tree, a hash table, a hash bucket, or any combination of these, as examples.

Communication interface 206 may be any component capable of performing the communication interface functions described herein, including facilitating wired and/or wireless communication between vehicle 102 and another entity (such as training server 110 or another entity of system 100). As such, communication interface 206 could take the form of an Ethernet, Wi-Fi, Bluetooth, and/or USB interface, among many other examples. Communication interface 206 may receive data over network 112 via communication links 114, for instance.

Vehicle sensors 210 include a sensor 220, a sensor 222, and a sensor 224. Sensor 220 could take the form a sensor operable to perform any of the sensor functions described herein, including a sensor operable to obtain sensor data (such as sensor data with respect to a road agent in proximity to vehicle 102 or another vehicle), as examples. The sensor could be positioned on vehicle 104, including an interior and/or exterior of the vehicle. The sensor could include a radar sensor, a lidar sensor, a camera, an accelerometer, a speedometer, or any combination of these or other sensors. The radar sensor, lidar sensor, and/or camera may obtain signals (such as electromagnetic radiation) that can be used by vehicle 102 to obtain information regarding a road agent and/or other objects in an environment of the vehicle. For example, the radar sensor and/or lidar sensor may send a signal (such as pulsed laser light or radio waves) and may obtain a distance measurement from the sensor to the surface of a road agent or other object based on a time of flight of the signal—that is, the time between when the signal is sent and when the reflected signal (reflected by the object surface) is received by the sensor. The camera may collect light or other electromagnetic radiation and may generate an image representing a trajectory of a road agent or an environment of vehicle 102 based on the collected radiation. Additionally or alternatively, the accelerometer and the speedometer may be used to detect an acceleration and a speed of a road agent, respectively. Sensor 220 may take other forms as well, and sensor 222 and/or sensor 224 may take a form similar to sensor 220. It will be appreciated by those of skill in the art that vehicle sensors 210 could include different and/or additional sensors.

System bus 212 may be any component capable of performing the system bus functions described herein. In an embodiment, system bus 212 is any component configured to transfer data between processor 202, data storage 204, communication interface 206, vehicle sensors 210, and/or any other component of vehicle 102. In an embodiment, system bus 212 includes a traditional bus as is known in the art. In other embodiments, system bus 212 includes a serial RS-232 communication link, a USB communication link, and/or an Ethernet communication link, alone or in combination with a traditional computer bus, among numerous other possibilities. In some examples, system bus 212 may be formed from any medium that is capable of transmitting a signal, such as conductive wires, conductive traces, or optical waveguides, among other possibilities. Moreover, system bus 212 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. It should be understood that system bus 212 may take various other forms as well.

Figure 3:
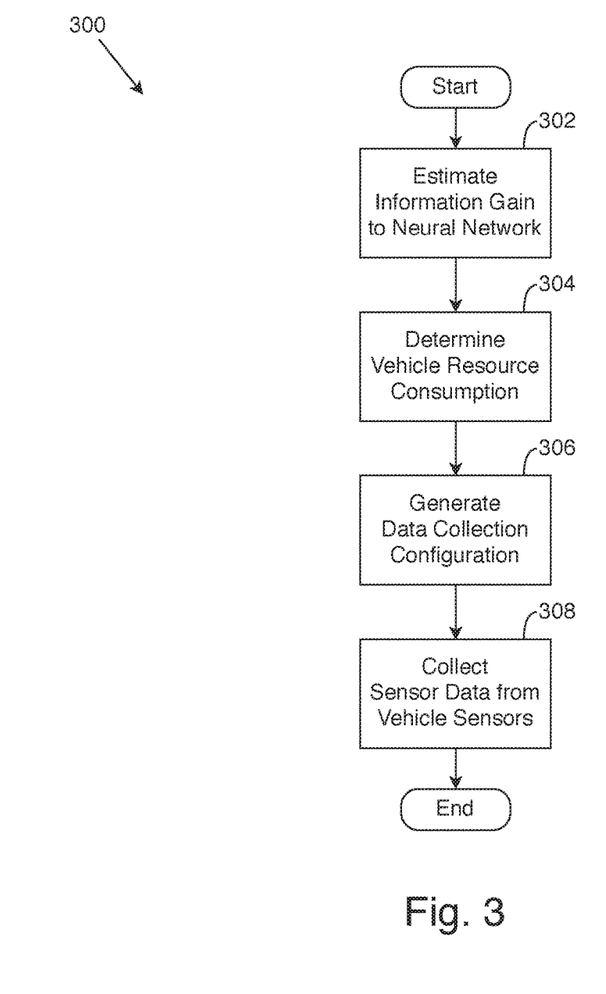
FIG. 3 depicts a flowchart of an example method of collecting sensor data from one or more vehicle sensors according to a generated data collection configuration, according to one or more embodiments illustrated and described herein.

FIG. 3 depicts a flowchart of a method of collecting sensor data from one or more vehicle sensors, according to one or more embodiments illustrated and described herein. Though the method is described as being carried out by vehicle 102, it will be appreciated that the method could be carried out by another component or combination of components, such as vehicle 104, vehicle 106, vehicle 108, training server 110, one or more other computing device, or a combination of these, as examples.

As shown, a method 300 begins at step 302 with vehicle 102 estimating an information gain to a neural network were the vehicle to provision the neural network with notional sensor data. The notional sensor data takes the form of (or includes) sensor data that would be collected from sensor 220 among vehicle sensors 210 according to a respective sensor configuration of the sensor (if vehicle 102 were to provision the neural network with the notional sensor data). Though the notional sensor data is described as sensor data that would be collected from sensor 220, it will be appreciated by those of skill in the art that the notional sensor data could be sensor data that would be collected from sensor 222, sensor 224, another sensor, or a combination of these or other sensors, as examples.

Figure 4:
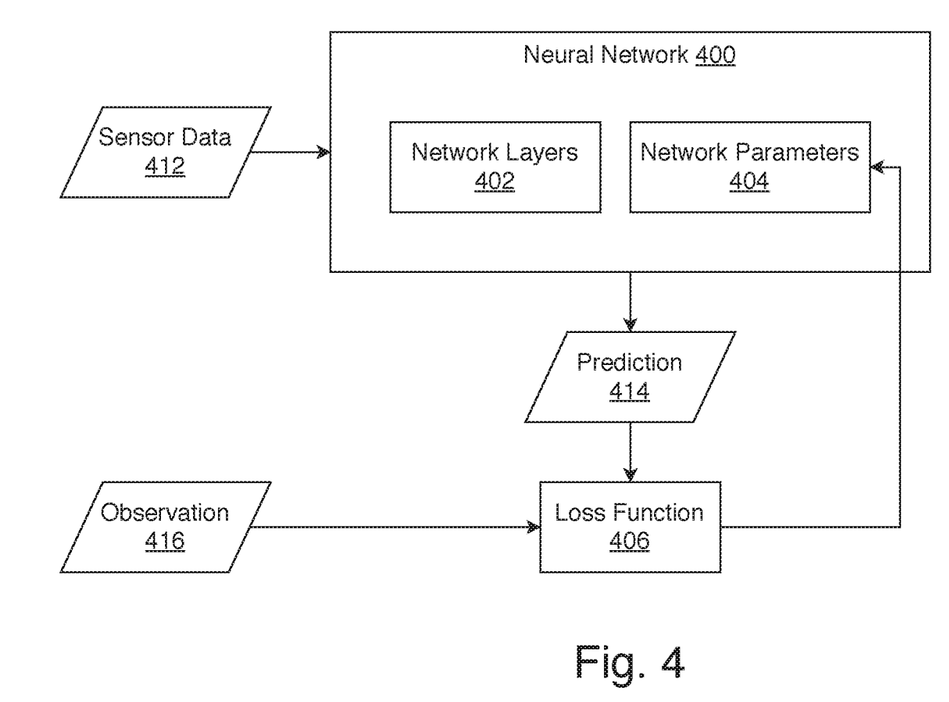
FIG. 4 depicts a block diagram of an example neural network configured to generate a prediction based on sensor data, according to one or more embodiments illustrated and described herein.

FIG. 4 depicts a block diagram of a neural network, according to one or more embodiments illustrated and described herein. As shown, a neural network 400 includes one or more network layers 402 and one or more network parameters 404. The neural network receives sensor data 412, and the neural network generates a prediction 414 based on the received sensor data. Neural network 400 could take the form of a feedforward neural network, a convolutional neural network, a recurrent neural network, a deep neural network (such as a deep convolutional neural network), or any combination of these or other artificial neural networks capable of carrying out the neural network functions described herein.

Network layers 402 could have a single layer, or could have multiple layers. In embodiments where network layers 402 have multiple layers, one of the layers could take the form of an input layer, and another layer could take the form of an output layer. Network layers other than the input layer and the output layer could take the form of hidden layers (e.g., between the input layer and the output layer). Each layer may generate an output based on input received from a previous layer (e.g., based on an output generated by the previous layer), except perhaps the input layer, which generates an output based on sensor data 412 or other data provided to the neural network. Prediction 414 (or other output from the neural network) may be generated by the output layer.

Network parameters 404 could take the form of one or more weights or other parameters, and neural network 400 may generate prediction 414 (or other output from the neural network) based on the network parameters. Network parameters 404 could include one or more weights for a respective layer among network layers 402, and the respective layer may generate an output based on the weights for the respective layer. In an embodiment, the respective layer includes multiple neurons having respective activation functions, and the respective layer generates the output via the activation functions. The weights for the layer could include one or more respective weights for each of the activation functions, and the output of the activation functions is generated based on the respective weights for the activation functions. Network parameters 404 could take other forms as well.

Instructions executed by a processor of a computing device (such as vehicle 102 or training server 110) may cause the computing device to execute the neural network. In an embodiment, neural network 400 is executed by training server 110. The training server includes a processor and a non-transitory computer-readable storage medium having instructions that, when executed by the processor, cause the training server to execute the neural network and/or one or more other training server functions described herein. In some embodiments, neural network 400 is executed by vehicle 102. In such an embodiment, instructions 205 may include instructions that cause the vehicle to execute the neural network.

The estimated information gain to the neural network may include an estimated information gain to the neural network were the vehicle to provision the neural network (e.g., executed by training server 110) with notional sensor data and were the neural network to be trained based on notional sensor data. Provisioning the neural network with sensor data could include, for instance, vehicle 102 collecting sensor data from a sensor and sending the sensor data to training server 110. Notional sensor data could be, for instance, sensor data that would hypothetically be, but has not yet (necessarily) been, collected from sensor 220 according to a respective sensor configuration of sensor 220 were the vehicle to provision the neural network with sensor data collected from sensor 220 according to the respective sensor configuration.

The estimated information gain to the neural network may reflect, for instance, an estimated increase in a quality of output generated by the neural network (the quality and associated increase being based on, e.g., a context in which the neural network is used). For instance, the estimated increase in quality could be an estimated increase of an accuracy of output generated by the neural network (e.g., an estimated increase in a confidence in the accuracy of the output), or an estimated increase of a certainty (i.e., a decrease of an uncertainty) of output generated by the neural network.

The respective sensor configuration for sensor 220, according to which notional sensor data would (hypothetically) be collected were the vehicle to provision the neural network with sensor data collected from sensor 220, may take the form of a sample rate of the sensor (e.g., a rate at which sensor data would be collected from sensor 220), a sample period of the sensor (e.g., a time period or time horizon), or another sensor configuration, as examples. Sensor data collected (or that would be collected) from sensor 220 could take the form of (or include) processed data reflecting values measured by the sensor. As another possibility, the sensor data could take the form of signals that may be used by vehicle 102 (e.g., processor 202 of the vehicle) to synthesize values measured by the sensor. Other examples of sensor data and sensor configurations are possible as well.

In some embodiments, the information gain is estimated by vehicle 102 at step 302 based on a sample set of sensor data (actually) collected from sensor 220. For instance, vehicle 102 may collect the sample set of sensor data from sensor 220 according to a test configuration of the sensor, which may or may not be the same respective configuration according to which sensor data would be collected from the sensor were the vehicle to provision the neural network with sensor data collected from the sensor.

In an embodiment, vehicle 102 generates a prediction of a characteristic (e.g., of a road agent) based on a sample set of sensor data collected from sensor 220 according to a test configuration of the sensor. The prediction is generated via an instance of the neural network executed by the vehicle. Additionally, vehicle 102 obtains an observation of the characteristic (of the road agent, for example) based on sensor data collected from vehicle sensors 210. In such an embodiment, the information gain is estimated at step 302 based on the prediction of the characteristic and the observation of the characteristic.

To illustrate, vehicle 102 may collect a sample set of sensor data from sensor 220. Based on the sample set of sensor data, the vehicle may generate, via an instance of the neural network executed by vehicle 102, a prediction of a trajectory of a road agent such as another vehicle. In addition, vehicle 102 obtains an observation of the actual trajectory taken by the road agent (the actual trajectory being the trajectory of the road agent that was the subject of the previous prediction). The observation of the actual trajectory is based on sensor data collected from vehicle sensors 210, which may include other sensor data in addition to (or instead of) the sample set of sensor data (or any other sensor data) collected from sensor 220. The sensor data upon which the observation is based may include sensor data collected from vehicle sensors 210 subsequent to generating the prediction. The information gain may then be estimated based on the prediction of the trajectory and the observation of the trajectory.

Estimating the information gain based on the prediction of the characteristic and the observation of the characteristic may include comparing the prediction with the observation and estimating the information gain based on the comparison. Comparing the prediction with the observation may in turn include determining a difference between the prediction and the observation, and the estimated information gain may be proportional to the determined difference. For instance, a small difference between the prediction of the trajectory of the road agent (as generated via the neural network) and the observation of the trajectory of the road agent may reflect a negligible information gain to neural network 400 if the vehicle were to provision the neural network with sensor data that would be collected from sensor 220 according to a respective sensor configuration of the sensor. The small difference may reflect that the neural network is already adequately trained to generate sufficiently accurate predictions (or otherwise generate predictions within desired specifications) based on sensor data collected from sensor 220 according to that respective sensor configuration for sensor 220. On the other hand, a large difference between the prediction and the observation may reflect that neural network 400 needs additional training based on (future) sensor data collected from sensor 220 according to the respective sensor configuration of the sensor, and that a non-negligible information gain to neural network 400 may result if vehicle 102 were to provision the neural network with (e.g., if the neural network were further trained based on) sensor data collected from sensor 220 according to the respective sensor configuration.

In an embodiment, estimating the information gain at step 302 includes predicting an error of network output from the neural network were the neural network to generate the network output based on the sample set of sensor data. Vehicle 102 predicts the error, via the instance of the neural network executed by the vehicle, based on the prediction of the characteristic and the observation of the characteristic. The error may take the form of (or otherwise reflect) the difference between the prediction and the observation as discussed above, among other possibilities. In one such embodiment, the estimated information gain is proportional to the predicted error. For example, a large error may coincide with a large difference between the prediction and the observation as previously discussed, perhaps reflecting that neural network needs additional training based on sensor data collected from sensor 220 according to the respective sensor configuration of the sensor, and thus possibly reflecting a large estimated information gain. A small error, in contrast, may coincide with a small difference between the prediction and the observation, reflecting perhaps that the neural network is already trained to generate sufficiently accurate predictions based on sensor data collected (or that would be collected) from sensor 220 according to the respective sensor configuration for sensor 220, and potentially reflecting a small estimated information gain proportionate with the small error.

Training server 110 may execute an instance of the neural network (e.g., separately from the instance of the neural network executed by vehicle 102). For example, in an embodiment, the information gain estimated at step 302 includes an estimated information gain to an instance of the neural network executed by training server 110 communicatively connected to vehicle 102. In one such embodiment, vehicle 102 executes an instance of neural network 400, and training server 110 executes another instance of the neural network separate from that executed by the vehicle. Network layers 402 of each instance are the same (e.g., the layers may contain the same activation functions), but network parameters 404 of the instance executed by vehicle 102 could be different from the network parameters of the instance executed by the training server such that the same inputs to the network layers may produce different results at the respective instances in accordance with the differing network parameters. In such an embodiment, it could be the case that vehicle 102 is limited to "estimating" the information gain at step 502, since a prediction of a characteristic generated by the vehicle instance of the neural network may differ from a prediction of the same characteristic generated by the training server instance of the neural network, and thus a vehicle comparison (by the vehicle) of the vehicle-generated prediction of the characteristic with an observation of the characteristic may differ from a training server comparison (by the training server) of the server-generated prediction of the characteristic with the observation of the characteristic.

It should be understood that the estimated information gain to the neural network (i.e., a first estimated information gain), were the vehicle to provision the neural network with sensor data that would be collected from sensor 220 according to the respective sensor configuration of the sensor (i.e., a first configuration), may be different from the estimated information gain to the neural network (i.e., a second estimated information gain) were the vehicle to provision the neural network with sensor data that would be collected from sensor 220 according to a different sensor configuration (i.e., a second configuration) other than the previously-mentioned respective sensor configuration. For instance, the second configuration could be a sample rate of sensor 220 that is higher or lower than a sample rate of the first configuration, and thus the second estimated information gain could be higher or lower than the first estimated information gain, perhaps because of the difference in sample rates. It should also be understood that, in the examples above, a characteristic other than a trajectory of a road agent could be predicted and observed by vehicle 102.

With reference again to FIG. 3, at step 304, vehicle 102 determines a vehicle resource consumption by the vehicle were the vehicle to provision the neural network with the notional sensor data (that would be collected from sensor 220 according to the respective sensor configuration of the sensor were the vehicle to provision the neural network with the notional sensor data). The vehicle resource consumption may include consumption of one or more vehicle resources by the vehicle were the vehicle to provision the neural network with the notional sensor data, as an example.

The vehicle resources (that is, the resources of vehicle 102) may include processor time or other processor capacity of processor 202 or of another processor of vehicle 102 (such as a graphics processing unit or GPU). As another example, the vehicle resources could include data blocks or another storage unit of data storage 204. The vehicle resources may include a data transfer amount or a data throughput of communication interface 206, which may be affected by resources of network 112 that are available to the communication interface and/or resources of a communication link that communicatively connect the vehicle to the network via the communication interface. For instance, the communication link may have a limited bandwidth, or may have a limit on the amount of data that may be transferred via the communication link over a given period of time. The vehicle resources may take the form of available resources (e.g., available processor time) of a component of vehicle 102 (e.g., processor 202) that could be shared with (e.g., consumed by) other functions of vehicle 102.

In an embodiment, the vehicle resource consumption includes at least one of a collection resource consumption to collect the notional sensor data from sensor 220 according to a respective sensor configuration of the sensor, and a provisioning resource consumption to provide the notional sensor data to training server 110. For instance, the collection resource consumption could include consumption of processor time of processor 202 to obtain signals from sensor 220 and to process the received signals so as to obtain data reflecting values measured by the sensor. The collection resource consumption could further include consumption of processor time to store the obtained data (reflected the measured values) to data storage 204, and could include consumption of data blocks of data storage 204 to store the obtained data in the data storage. The provisioning resource consumption could include consumption of processor time of processor 202 to generate one or more network packets that include sensor data collected from sensor 220, and could include consumption of data throughput of communication interface 206 to send the networks packets (containing the sensor data) to training server 110 over network 112 via communication links 114. In some embodiments, provisioning the neural network with sensor data includes collecting the sensor data from the vehicle sensors (e.g., from sensor 220), and the vehicle resource consumption to provision the neural network with sensor data includes the vehicle resource consumption to collect the sensor data. Numerous other examples of vehicle resource consumption are possible as well without departing from the scope of the disclosure.

At step 306, vehicle 102 generates a data collection configuration for vehicle sensors 210 based on the information gain estimated at step 302 and the vehicle resource consumption determination at step 304.

In an example, generating the data collection configuration includes comparing the benefits of provisioning the neural network with sensor data from sensor 220 (that would be collected from sensor 220 according to a respective sensor configuration of the sensor), with the costs of provisioning the neural network with the sensor data from sensor 220 (that would be collected as above). For instance, the comparison may occur prior to collection (or any prolonged collection) of sensor data from the sensor according to the respective sensor configuration, or prior to provisioning of the neural network with sensor data that would be collected according to the respective sensor configuration (the provisioning perhaps including the previously-mentioned collection of sensor data). In this example, the benefits include the estimated information gain to the neural network were the vehicle to provision the neural network with sensor data that would be collected according to the respective sensor configuration of sensor 220, and the costs include the vehicle resource consumption by the vehicle to provision the neural network with sensor data that would be collected according to the respective sensor configuration of sensor 220. According to this example, if the benefits outweigh the costs, then the generated data collection configuration will include the sensor configuration of sensor 220. Therefore, when the vehicle collects sensor data from vehicle sensors 210 according to the generated data collection configuration, the vehicle will collect sensor data from sensor 220 according to the respective sensor configuration of the sensor. On the other hand, if the costs outweigh the benefits, then the generated data collection configuration will not include the sensor configuration of sensor 220, and when the vehicle collects sensor data from vehicle sensors 210 according to the generated data collection configuration, sensor data will not be collected from sensor 220, or if sensor data is collected from sensor 220, it is collected according to a different sensor configuration of the sensor.

In some embodiments, generating the data collection configuration includes performing a comparison of the estimated information gain with the vehicle resource consumption, and then generating the data collection configuration based on the comparison. For instance, performing the comparison may include determining both an information gain score based on the estimated information gain and a resource consumption score based on the vehicle resource consumption. The information gain score could reflect a magnitude of the estimated information gain, and the resource consumption score could reflect a magnitude of the vehicle resource consumption. Vehicle 102 may perform a score comparison of the information gain score with the resource consumption score, and may generate the data collection configuration based on the score comparison.

In one such embodiment, generating the data collection configuration based on the score comparison involves vehicle 102 including the respective sensor configuration of sensor 220 in the generated data collection configuration, when the information gain score exceeds the resource consumption score. As an example, generating the data collection configuration based on the score comparison may include making a determination that the information gain score exceeds the resource consumption score, and in response to making the determination, generating a data collection configuration that includes the respective sensor configuration of sensor 220. In such an embodiment, collecting sensor data from vehicle sensors 210 according to the generated data collection configuration may include collecting sensor data from sensor 220 according to the respective sensor configuration of sensor 220 included in the generated data collection configuration.

In another embodiment, generating the data collection configuration based on the score comparison involves vehicle 102 not including the respective sensor configuration of sensor 220 in the generated data collection configuration, when the information gain score does not exceed the resource consumption score—for instance, by suppressing generation of a data collection configuration that includes the respective sensor configuration of sensor 220. As an example, generating the data collection configuration based on the score comparison may include making a determination that the information gain score does not exceed the resource consumption score, and in response to making the determination, generating a data collection configuration that does not include the respective sensor configuration of sensor 220. In such an embodiment, collecting sensor data from vehicle sensors 210 according to the generated data collection configuration may include not collecting any sensor data from sensor 220, or may include collecting sensor data from sensor 220 but according to a different sensor configuration of the sensor—perhaps by suppressing collection of sensor data from sensor 220 according to the respective sensor configuration.

In an embodiment, the notional sensor data (that would be collected were vehicle 102 to provision the neural network with the notional sensor data) takes the form of (or includes) sensor data that would be collected from sensor 220 at a first sampling rate according to the respective sensor configuration of the sensor. The test configuration of sensor 220 (according to which the sample set of sensor data is collected from sensor 220) includes a second sample rate of sensor 220 that is lower than the first sample rate. In such an embodiment, the information gain estimated at step 302 includes an estimated information gain to the neural network were the vehicle 102 to provision the neural network with sensor data that would be collected from sensor 220 at the second sample rate according to the test configuration. The estimated information gain further includes a prediction (e.g., reflect an inference) that an information gain to the neural network (were vehicle 102 to provision the neural network with the notional sensor data) would be at least the estimated information gain to the neural network were the vehicle to provision the neural network with the sensor data that would be collected from sensor 220 at the second sample rate.

For instance, in an embodiment, the sample set of sensor data is collected from sensor 220 at a sample rate $r1=10$ Hz. At step 302, vehicle 102 generates a prediction of a characteristic (e.g., of a road agent) based on the sample set of sensor data, and further obtains an observation of the characteristic. The vehicle then estimates an information gain to a neural network were the vehicle to provision the neural network with sensor data that would be collected from sensor 220 at sample rate $r1$. Additionally, at step 304, vehicle 102 determines a vehicle resource consumption by the vehicle were the vehicle to provision the neural network with sensor data that would be collected from sensor 220 at a sample rate r0=20 Hz (or another sample rate that is no less than r1=10 Hz).

At step 306 of the present embodiment, vehicle 102 generates a data collection configuration for vehicle sensors 210 based on a comparison of an estimated information gain to the neural network were the vehicle to provision the neural network with sensor data that would be collected from sensor 220 at sample rate r0=20 Hz, and further based on the vehicle resource consumption by the vehicle were the vehicle to provision the neural network with sensor data that would be collected from sensor 220 at the same sample rate r0=20 Hz (as determined at step 304).

This estimated information gain (that is compared with the vehicle resource consumption in this embodiment) takes the form of or includes both (i) the estimated information gain to the neural network were the vehicle to provision the neural network with sensor data that would be collected from sensor 220 at sample rate r1=10 Hz, and (ii) a prediction (e.g., an inference) that of an information gain to the neural network were the vehicle to provision the neural network with sensor data that would be collected from sensor 220 at sample rate r0=20 Hz would be at least the estimated information gain of (i). Accordingly, it could be assumed that the estimated information gain compared with the vehicle resource consumption is at least the estimated information gain of (i), even though the estimated information gain of (i) assumes a sample rate of sensor 220 that is different from (e.g., lower than) the sample rate assumed for the vehicle resource consumption.

It will be appreciated by those of skill in the art that generating the data collection configuration at step 306 may take other forms as well.

At step 308, vehicle 102 collects sensor data from vehicle sensors 210 according to the data collection configuration generated at step 306. In some embodiments, collecting sensor data from vehicle sensors 210 according to the data collection configuration includes vehicle 102 provisioning the neural network with sensor data collected from sensor 220 according to the respective sensor configuration of the sensor—for example, if the generated data collection configuration includes the respective sensor configuration of sensor 220. Provisioning the neural network with sensor data (collected from sensor 220 and/or other sensors) could take the form of or include the (hypothetical) provisioning described previously, though in this case, the vehicle would actually provision the neural network with sensor data.

Figure 5:
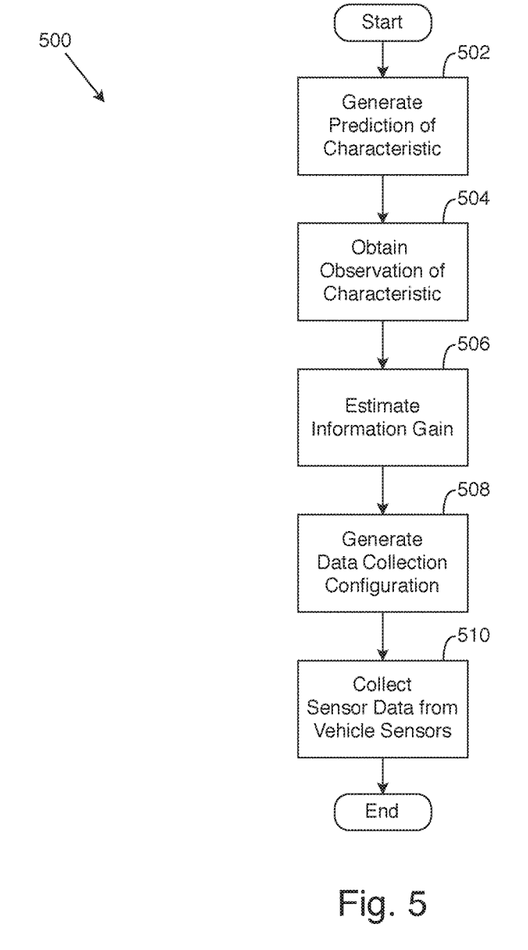
FIG. 5 depicts a flowchart of an example method of collecting sensor data from one or more vehicle sensors according to a generated data collection configuration, according to one or more embodiments illustrated and described herein.

FIG. 5 depicts a flowchart of a method of collecting sensor data from one or more vehicle sensors, according to one or more embodiments illustrated and described herein. As shown, a method 500 begins at step 502 with vehicle 102 generating a prediction of a characteristic of a road agent based on a sample set of sensor data collected from a given sensor among one or more vehicle sensors of a vehicle according to a test configuration of the given sensor. At step 504, the vehicle obtains an observation of the characteristic of the road agent based on sensor data collected from the vehicle sensors. At step 506, the vehicle estimates an estimated information gain to a neural network were the vehicle to provision the neural network with notional sensor data. The notional sensor data takes the form of (or includes) sensor data that would be collected from a given sensor among the vehicle sensors according to a respective sensor configuration of the given sensor. Additionally, the estimated information gain is based on a comparison of the prediction of the characteristic with the observation of the characteristic. Additional details with respect to generating the prediction of the characteristic, obtaining the observation of the characteristic, and estimating the information gain based on the comparison of the prediction with the observation are provided above with reference to step 302 of FIG. 3.

At step 508, vehicle 102 generates a data collection configuration for the vehicle sensors based on the estimated information gain and a vehicle resource consumption by the vehicle were the vehicle to provision the neural network with the notional sensor data. Further, at step 510, vehicle 102 collects sensor data from the vehicle sensors according to the generated data collection configuration. As with method 300 described above, it will be appreciated that method 500 could be carried out by another component or combination of components, such as vehicle 104, vehicle 106, vehicle 108, training server 110, one or more other computing device, or a combination of these, as examples.

Figure 6:
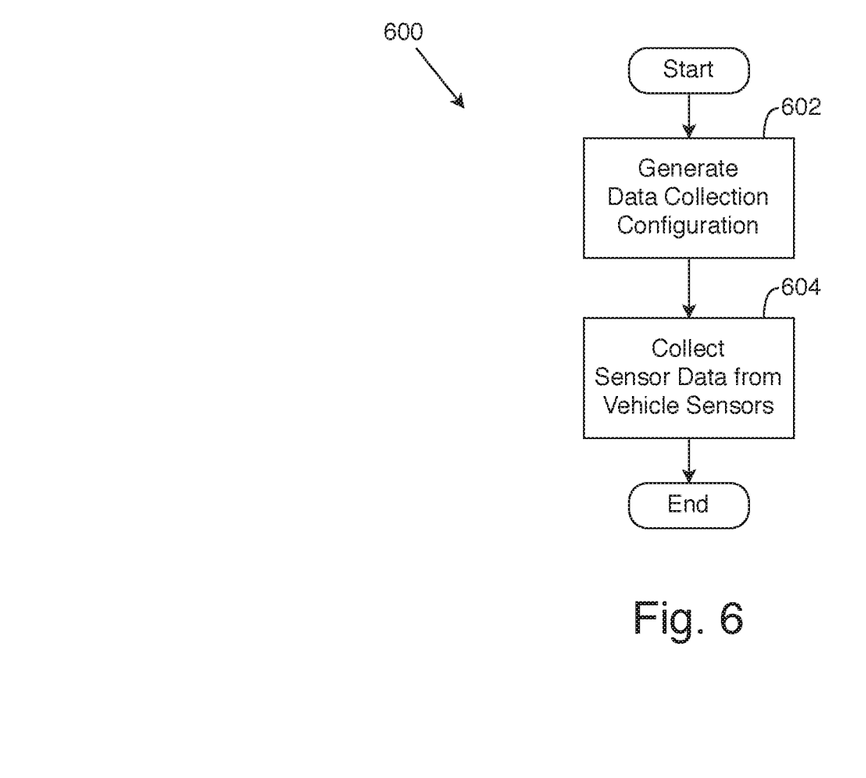
FIG. 6 depicts a flowchart of an example method of collecting sensor data from one or more vehicle sensors, according to one or more embodiments illustrated and described herein.

FIG. 6 depicts a flowchart of a method of collecting sensor data from one or more vehicle sensors, according to one or more embodiments illustrated and described herein. As shown, a method 600 begins at step 602 with vehicle 102 generating a data collection configuration for one or more vehicle sensors of a vehicle based on an estimated information gain to a neural network were the vehicle to provision the neural network with notional sensor data, and based on a vehicle resource consumption by the vehicle were the vehicle to provision the neural network with the notional sensor data. The notional sensor data takes the form of (or includes) sensor data that would be collected from a given sensor among the vehicle sensors according to a respective sensor configuration of the given sensor. At step 604, vehicle 102 collects sensor data from the vehicle sensors according to the generated data collection configuration. It will be appreciated that method 600 could be carried out by another component or combination of components.

It will be appreciated by those of skill in the art that other variations of the embodiments described above are possible without departing from the scope of the disclosure. For instance, the notional sensor data could further include sensor data that would be collected from a given second sensor among the vehicle sensors according to a respective second sensor configuration of the given second sensor—for example, if the vehicle were to provision the neural network with notional sensor data. Accordingly, the estimated information gain could reflect an estimated information gain to the neural network were the vehicle to provision the neural network with both sensor data collected from sensor 220 according to a respective sensor configuration of sensor 220 as well as sensor data collected from sensor 222 (or another sensor other than sensor 220) according to a respective sensor configuration of sensor 222. Other variations are possible as well.

It should now be understood that embodiments described herein are directed to systems, vehicles, computing devices, and methods for collecting sensor data from one or more vehicle sensors according to a data collection configuration based on an estimated information gain to a neural network. In some embodiments, a vehicle generates a data collection configuration for one or more vehicle sensors of a vehicle based on an estimated information gain to a neural network were the vehicle to provision the neural network with notional sensor data, and based on a vehicle resource consumption by the vehicle were the vehicle to provision the neural network with the notional sensor data. The notional sensor data comprises sensor data that would be collected from a given sensor among the vehicle sensors according to a respective sensor configuration of the given sensor. The vehicle collects sensor data from the vehicle sensors according to the generated data collection configuration. Because the data collection configuration is generated based on the estimated information gain and the vehicle resource consumption were the vehicle to provision the neural network with sensor data that would be collected from the given sensor according to the respective sensor configuration of the given sensor, the subsequent collection of sensor data from the vehicle sensors according to the generated data collection configuration may reflect a comparison of the benefits (e.g., the estimated information gain) and the costs (e.g., the vehicle resource consumption) of provisioning the neural network with sensor data that would be collected from the given sensor.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method comprising:
generating a data collection configuration for one or more vehicle sensors of a vehicle based on:
an estimated information gain to a neural network were the vehicle to provision the neural network with notional sensor data, and
a vehicle resource consumption by the vehicle were the vehicle to provision the neural network with the notional sensor data,
the notional sensor data comprising sensor data that would be collected from a given sensor among the vehicle sensors according to a respective sensor configuration of the given sensor; and
collecting sensor data from the vehicle sensors according to the generated data collection configuration.

2. The method of claim 1, wherein generating the data collection configuration comprises:
generating a prediction of a characteristic of a road agent based on a sample set of sensor data collected from the given sensor according to a test configuration of the given sensor; and
obtaining an observation of the characteristic of the road agent based on sensor data collected from the vehicle sensors,
wherein the estimated information gain is based on the prediction of the characteristic and the observation of the characteristic.

3. The method of claim 2, wherein generating the data collection configuration further comprises:
predicting an error of network output from the neural network were the neural network to generate the network output based on the sample set of sensor data,
wherein the error is predicted via a vehicle-executed instance of the neural network executed by the vehicle, the error being predicted based on the prediction of the characteristic and the observation of the characteristic.

4. The method of claim 3, wherein the estimated information gain is proportional to the predicted error.

5. The method of claim 2, wherein:
the notional sensor data comprises sensor data that would be collected from the given sensor at a first sample rate according to the respective sensor configuration of the given sensor,
the test configuration of the given sensor comprises a second sample rate of the given sensor lower than the first sample rate, and
the estimated information gain comprises:
an estimated information gain to the neural network were the vehicle to provision the neural network with sensor data that would be collected from the given sensor at the second sample rate according to the test configuration, and
a prediction that an information gain to the neural network were the vehicle to provision the neural network with the notional sensor data would be at least the estimated information gain to the neural network were the vehicle to provision the neural network with the sensor data that would be collected from the given sensor at the second sample rate.

6. The method of claim 1, wherein the estimated information gain to the neural network comprises an estimated information gain to an instance of the neural network executed by a training server communicatively connected to the vehicle.

7. The method of claim 6, wherein the vehicle resource consumption comprises at least one of:
a collection resource consumption to collect the notional sensor data from the given sensor according to a respective sensor configuration of the given sensor, and
a provisioning resource consumption to provide the notional sensor data to the training server.

8. The method of claim 1, wherein the notional sensor data further comprises sensor data that would be collected from a given second sensor among the vehicle sensors according to a respective second sensor configuration of the given second sensor.

9. The method of claim 1, wherein:
the generated data collection configuration comprises the respective sensor configuration of the given sensor, and
collecting sensor data from the vehicle sensors according to the generated data collection configuration comprises collecting sensor data from the given sensor according to the respective sensor configuration of the given sensor.

10. A vehicle comprising:
one or more vehicle sensors,
a processor, and
a non-transitory computer-readable storage medium comprising instructions that, when executed by the processor, cause the vehicle to:
generate a data collection configuration for the vehicle sensors based on (i) an estimated information gain to a neural network were the vehicle to provision the neural network with notional sensor data, and (ii) a vehicle resource consumption by the vehicle were the vehicle to provision the neural network with the notional sensor data; and
collect sensor data from the vehicle sensors according to the generated data collection configuration,
wherein the notional sensor data comprises sensor data that would be collected from a given sensor among the vehicle sensors according to a respective sensor configuration of the given sensor.

11. The vehicle of claim 10, wherein the instructions to generate the data collection configuration comprise instructions to:
generate a prediction of a characteristic of a road agent based on a sample set of sensor data collected from the given sensor according to a test configuration of the given sensor; and
obtain an observation of the characteristic of the road agent based on sensor data collected from the vehicle sensors,
wherein the estimated information gain is based on the prediction of the characteristic and the observation of the characteristic.

12. The vehicle of claim 11, wherein the instructions to generate the data collection configuration further comprise instructions to:
predict an error of network output from the neural network were the neural network to generate the network output based on the sample set of sensor data,
wherein the error is predicted via a vehicle-executed instance of the neural network executed by the vehicle, the error being predicted based on the prediction of the characteristic and the observation of the characteristic.

13. The vehicle of claim 12, wherein the estimated information gain is proportional to the predicted error.

14. The vehicle of claim 11, wherein:
the notional sensor data comprises sensor data that would be collected from the given sensor at a first sample rate according to the respective sensor configuration of the given sensor,
the test configuration of the given sensor comprises a second sample rate of the given sensor lower than the first sample rate, and
the estimated information gain comprises:
an estimated information gain to the neural network were the vehicle to provision the neural network with sensor data that would be collected from the given sensor at the second sample rate according to the test configuration, and
a prediction that an information gain to the neural network were the vehicle to provision the neural network with the notional sensor data would be at least the estimated information gain to the neural network were the vehicle to provision the neural network with the sensor data that would be collected from the given sensor at the second sample rate.

15. The vehicle of claim 10, wherein:
the vehicle further comprises a communication interface via which the vehicle is communicatively connected to a training server, and
the estimated information gain to the neural network comprises an estimated information gain to an instance of the neural network executed by the training server.

16. The vehicle of claim 15, wherein the vehicle resource consumption comprises at least one of:
a collection resource consumption to collect the notional sensor data from the given sensor according to a respective sensor configuration of the given sensor, and
a provisioning resource consumption to provide the notional sensor data to the training server.

17. The vehicle of claim 10, wherein the notional sensor data further comprises sensor data that would be collected from a given second sensor among the vehicle sensors according to a respective second sensor configuration of the given second sensor.

18. A method comprising:
generating a prediction of a characteristic of a road agent based on a sample set of sensor data collected from a given sensor among one or more vehicle sensors of a vehicle according to a test configuration of the given sensor;
obtaining an observation of the characteristic of the road agent based on sensor data collected from the vehicle sensors;
estimating an estimated information gain to a neural network were the vehicle to provision the neural network with notional sensor data, the notional sensor data comprising sensor data that would be collected from a given sensor among the vehicle sensors according to a respective sensor configuration of the given sensor, the estimated information gain being based on a comparison of the prediction of the characteristic with the observation of the characteristic;
generating a data collection configuration for the vehicle sensors based on the estimated information gain and a vehicle resource consumption by the vehicle were the vehicle to provision the neural network with the notional sensor data; and
collecting sensor data from the vehicle sensors according to the generated data collection configuration.

19. The method of claim 18, wherein the estimated information gain to the neural network comprises an estimated information gain to an instance of the neural network executed by a training server communicatively connected to the vehicle.

20. The method of claim 19, wherein the vehicle resource consumption comprises at least one of:
a collection resource consumption to collect the notional sensor data from the given sensor according to a respective sensor configuration of the given sensor, and
a provisioning resource consumption to provide the notional sensor data to the training server.

* * * * *